May 18, 1948. M. WATTER 2,441,858
METHOD OF MAKING FABRICATED STRUCTURES
Filed Feb. 25, 1944 2 Sheets-Sheet 1

INVENTOR
Michael Watter.
BY John P. Tarbox
ATTORNEY

May 18, 1948. M. WATTER 2,441,858
METHOD OF MAKING FABRICATED STRUCTURES
Filed Feb. 25, 1944 2 Sheets-Sheet 2
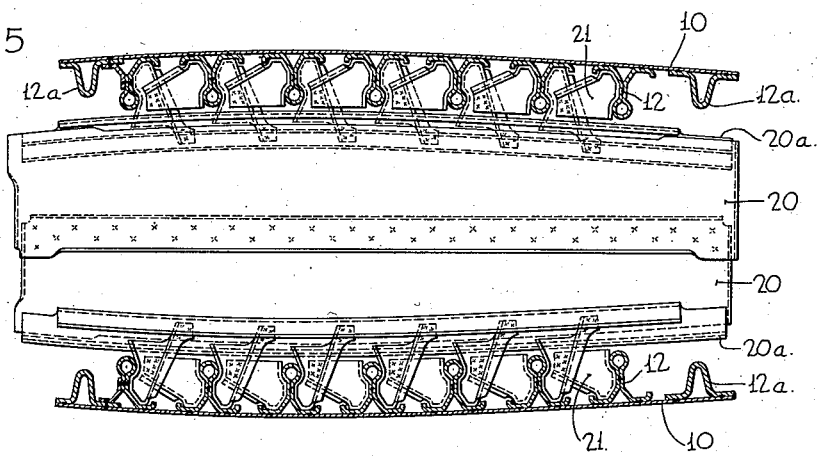
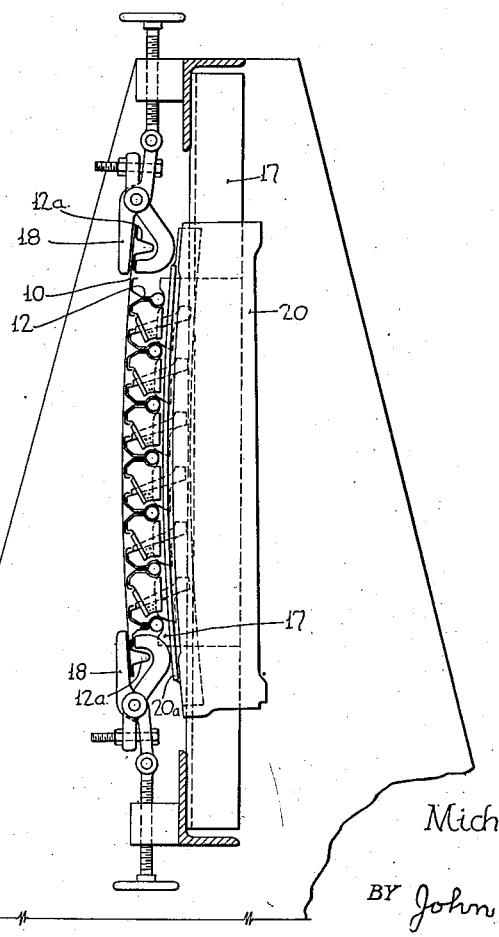
INVENTOR
Michael Watter.
BY John P. Tarbox
ATTORNEY Patented May 18, 1948

2,441,858

UNITED STATES PATENT OFFICE 2,441,858

METHOD OF MAKING FABRICATED STRUCTURES

Michael Watter, Philadelphia, Pa., assignor to The Budd Company, Philadelphia, Pa., a corporation of Pennsylvania Application February 25, 1944, Serial No. 523,845

10 Claims. (Cl. 29—148.2)

This invention relates to sheet metal working, particularly to a method for obtaining a smooth taut sheet on a supporting frame, and has for an object the provision of improvements in this art.

While the invention has various applications, it will be discussed principally in connection with the application for which it was developed, namely the attachment of thin sheets of cold-rolled stainless steel to the framework of aircraft airfoils by spotwelding.

It is desirable to have a smoothly stretched skin on airfoils. The cold-rolled sheets are very much elongated but not always free from wrinkles. It is desirable to remove these wrinkles. The present method permits the use of sheets with some initial wrinkles; but preferably provides for first pulling the sheets slightly beyond the elastic limit or yield point to eliminate the wrinkles.

When cold-rolled metal sheets are resistance spot-welded there is a slight contraction at each weld, even when the most favorable known method is used, namely one in which the metal is fused only interiorly adjacent the faying surfaces and not to the outer surfaces and rapidly cooled after welding, as by retaining it between fluid cooled electrodes until below the dangerous temperature. The cumulative effect of a number of such welds, say along lines at ⅛ inch spacing more or less, is to form wrinkles or dishpans in the sheet. In my copending application, Serial Number 392,511, filed May 8, 1941, Patent No. 2,342,025, I have disclosed a "two-way" stretch method of tightening the skin in all directions and welding it to a frame while so stretched.

However, it is not always practically possible to stretch in both directions at one stage; and the present invention provides a novel method for obtaining a taut wrinkle-free skin covering under these circumstances.

The objects and advantages of the invention will be apparent from the following description of one embodiment thereof, reference being made to the accompanying drawings, wherein:

Fig. 4 is a corresponding end view; and

Fig. 5 is a section to show the attachment of the skin to the transverse frame members.

Figure 1:
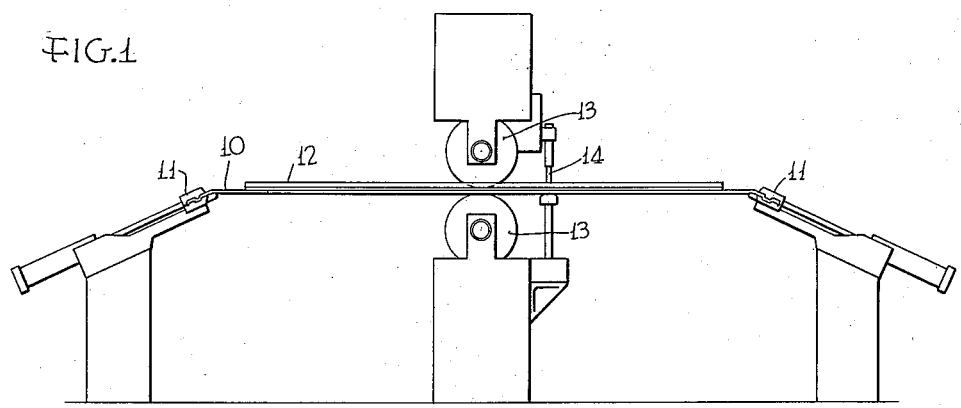
Fig. 1 is a diagrammatic side view of a sheet being stretched within the elastic limit while longitudinal stringers are welded thereto.
Figure 2:
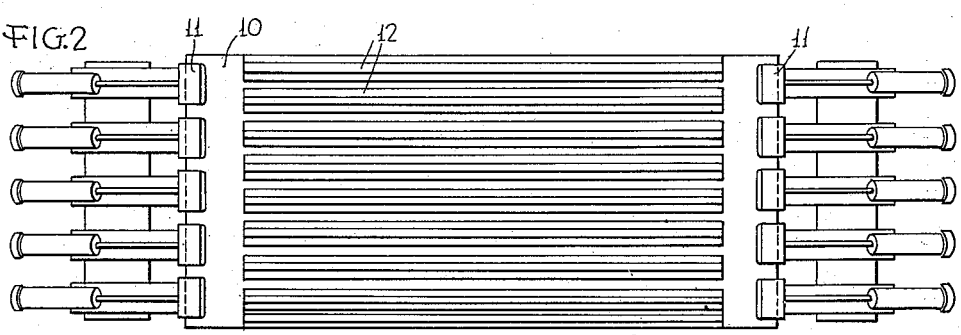
Fig. 2 is a corresponding plan view without the welder.

Figs. 1 and 2 show a skin sheet 10, as of cold-rolled stainless steel (shown greatly exaggerated in thickness), which is stretched, well within its elastic limit, by holding and stretching devices 11 at each end. While so stretched, the skin has a plurality of longitudinal stiffeners or stringers 12 secured to it, as by welding with roller electrodes 13. The skin sheet may be composed of one or more widths of stock sheet cut to length, and each sheet, before or after it is cut to length, is preferably stretched in known manner slightly beyond its elastic limit to eliminate initial wrinkles. The welding causes some local shrinkage which the peening device 14 takes out. After the stringers have been attached, any excess sheet material may be trimmed off.

Figure 3:
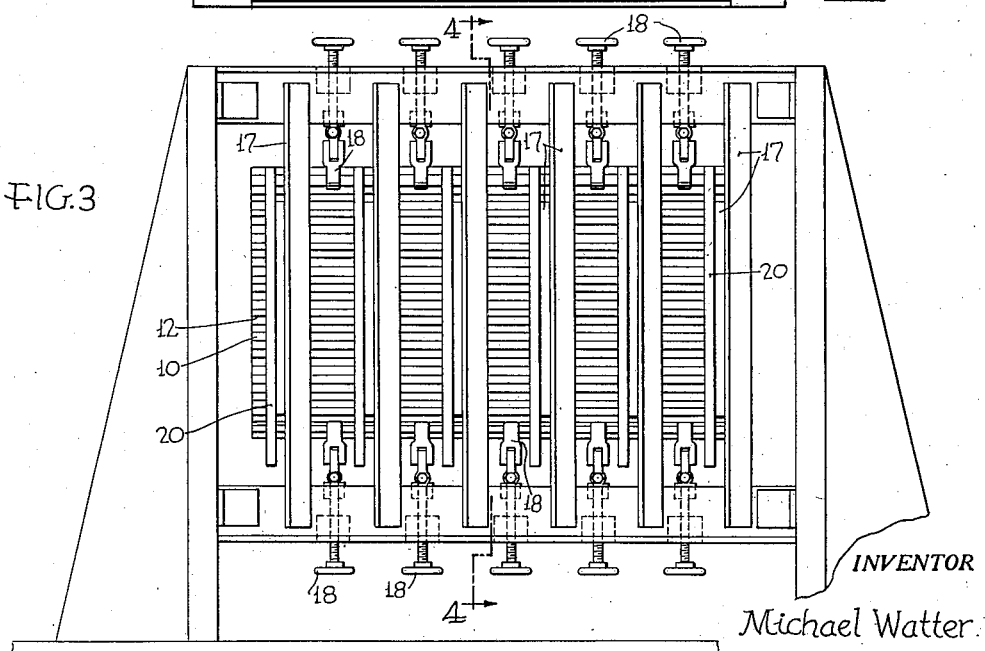
Fig. 3 is a diagrammatic side elevation to show the jigging and transverse stretching of the skin blanket of Fig. 2 in preparation for attaching it to transverse frame members.

As shown in Figs. 3 to 5, the reinforced assembly of skin sheet 10 and stringers 12, referred to as the skin blanket, is placed in a suitable jig having ribs 17 and stretched transversely within the elastic limit by holding and stretching devices 18. The edge stringers 12a assist materially in distributing the stretching forces evenly along the length of the sheet, besides serving their permanent function as border retainers. A rib element 20 is brought into attaching position in the jig, but prior to its placement the skin blanket is provided with attaching clips 21. The blanket is attached to the rib element 20 by welding the lower ends of the clips to the sides of rib chords 20a. It is desired, in order to avoid chafing in use, that the stringers 12 shall not engage the rib elements 20, hence the parts will be held the proper distance apart during assembly, as by temporary non-metallic spacers between the stringers and the rib elements or by holding the rib elements on the jig frame while another part of the jig holds the skin blanket in the contoured shape desired and spaced from the rib elements.

The rib elements 20 and skin blanket 10, 12 together constitute a half-shell which may be joined to a mating half-shell rib 20, shown in Fig. 5, to form a full airfoil section. The section herein illustrated is a main or central section to which spars and leading and trailing sections may be added.

Airfoils made in accordance with the described method have a smooth skin even when made of very thin sheet stock which normally exhibits very pronounced wrinkling and dishpanning. Moreover, the method is very easily and economically performed due to the judicious division of stretching and assembling steps in relation to the structure involved. All parts are freely accessible for the manufacturing operations involved; and the tools, such as welding devices, riveters, or the like, are permitted to be light and simple. It is now possible to use a roller welder for securing the stringers while the skin sheet is in the flat, as shown in Fig. 1, and to use welding guns while the skin blanket is stretched in curved airfoil shape, as shown in Fig. 4. Roller welding operations in the flat, are, of course, very economical as compared to using a welding gun separately for each of a great number of welds. The number of welds which have to be made separately by welding guns in attaching the clips, is relatively small and in keeping with operational economy.

While one embodiment of the invention has been described for the purposes of illustration, it is to be understood that there may be various embodiments within the limits of the prior art and the scope of the subjoined claims.

What is claimed is:

1. The method of making structures such as airfoils and the like to secure a taut smooth metal skin sheet on a frame, which comprises, stretching a sheet endwise and attaching longitudinal frame members only thereto along their length in the direction of stretch while the skin is so stretched to form a skin blanket thereafter, comprising the skin sheet and longitudinal frame members without transverse frame members stretching the skin blanket transversely of the first direction of stretch, and attaching transverse frame members thereto along their length in the direction of stretch while the skin blanket is so stretched.

2. The method of making structures such as airfoils and the like to secure a taut smooth thin metal skin sheet on a frame, which comprises, stretching a skin sheet endwise independently of any frame element to be associated therewith and attaching longitudinal frame members only thereto along their length in the direction of stretch while the skin sheet is so stretched to form a skin blanket comprising the skin sheet and longitudinal frame members without transverse frame members, stretching the skin blanket transversely independently of any frame elements to be associated therewith, and attaching transverse frame members thereto along their length in the direction of stretch while the skin blanket is so stretched.

3. The method of making structures such as airfoils and the like to secure a taut smooth skin sheet on a frame, which comprises, stretching a skin sheet endwise and attaching longitudinal stringers only thereto along their length in the direction of stretch while the skin sheet is so stretched to form a skin blanket comprising the skin sheet and longitudinal frame members without transverse frame members, securing attaching clips to the skin blanket in position to be connected to transverse frame members, stretching the skin blanket transversely, and attaching transverse frame members thereto along their length in the direction of stretch through said clips while the skin blanket is so stretched.

4. The method of making structures such as airfoils and the like to secure a taut smooth thin metal skin sheet on a frame, which comprises, securing a skin sheet in longitudinal tension to longitudinal frame elements only to form a skin blanket comprising the skin sheet and longitudinal frame members without transverse frame members, and then securing the skin blanket in transverse tension to transverse frame elements to form a rigid skin-covered frame assembly.

5. The method of making structures such as airfoils and the like to secure a taut smooth thin metal skin sheet on a frame, which comprises, securing a skin sheet in longitudinal tension to longitudinal frame elements only to form a skin blanket comprising the skin sheet and longitudinal frame members without transverse frame members, and then securing the skin blanket in transverse tension to transverse frame elements to form a rigid skin-covered frame assembly, the transverse tension being achieved by an equalized pull along the edge of the blanket, and the transverse frame elements being secured to the blanket after it has been so stretched and while maintained under tension.

6. The method of making structures such as airfoils and the like to secure a taut smooth skin sheet of thin cold-rolled high tensile stainless steel on a metal frame, which comprises, stretching a cold-rolled stainless steel sheet longitudinally beyond its elastic limit to remove wrinkles, stretching the sheet in one coordinate direction well within the elastic limit while spot welding longitudinal stiffeners along their length to the sheet to form a skin blanket comprising the skin sheet and longitudinal frame members without transverse frame members, the stringers including edge stringers, cutting off the excess metal to the proper finished size of the sheet, welding attaching clips to the skin blanket in the other coordinate direction along lines of rigid transverse frame members which are to be attached, stretching the skin blanket in the second coordinate direction through said edge stringers well within the elastic limits of the metal, and welding the rigid transverse frame members thereto through the attaching clips.

7. The method as set forth in claim 6, which further includes the step of stretching said skin blanket around and upon the convex curved surface of rigid convex curved transverse supporting members and pressing it thereagainst during welding.

8. The method of making structures such as airfoils and the like to secure a taut smooth metal skin sheet on a frame, which comprises, as separate operations performed at different times, stretching a sheet in longitudinal and transverse directions, and at each stretching operation attaching an elongated frame element in alignment with the direction of stretch without attaching a frame element aligned with the non-stretched direction while the skin sheet is stretched in the other direction.

9. The method as set forth in claim 8 which comprises, making the attachment of the second frame element to the assembly by clips which are attached to one of the frame elements in a pre-assembly operation and are attached to the other frame element in a later assembly operation.

10. The method of securing a taut skin on an enclosed structure such as an airfoil, which comprises, forming skin blankets, each by stretching a skin sheet endwise and attaching longitudinal frame members only thereto along and throughout their length while the skin is so stretched in the direction of the length of the stringers to form a skin blanket comprising the skin sheet and the longitudinal frame members but without transverse frame members whereby to prevent transverse stretch of the blanket, then stretching each skin blanket transversely and attaching transverse mating rib elements thereto to form half-shells, and then securing the mating rib elements together interiorly between the skin blankets to secure the half-shells together.

MICHAEL WATTER.

REFERENCES CITED

The following references are of record in the file of this patent:

UNITED STATES PATENTS

| Number | Name | Date |
|---|---|---|
| 1,549,251 | Geyer | Aug. 11, 1930 |
| 1,603,051 | Hall | Oct. 12, 1926 |
| 1,781,723 | Fox | Nov. 18, 1930 |
| 1,856,143 | Thadden | May 3, 1932 |
| 2,110,752 | Wright | Mar. 8, 1938 |
| 2,324,435 | Smith | July 13, 1943 |
| 2,342,025 | Watter | Feb. 15, 1944 |